United States Patent [19]

Yanagita

[11] Patent Number: 4,536,854
[45] Date of Patent: Aug. 20, 1985

[54] DECIMAL ARITHMETIC UNIT
[75] Inventor: Tomoatsu Yanagita, Isehara, Japan
[73] Assignee: Hitachi, Ltd., Tokyo, Japan
[21] Appl. No.: 403,330
[22] Filed: Jul. 30, 1982
[30] Foreign Application Priority Data Aug. 12, 1981 [JP] Japan ................. 56-125179

[51] Int. Cl.³ .............................................. G06F 7/38
[52] U.S. Cl. ................................................. 364/749
[58] Field of Search ............... 364/736, 749, 768, 778, 364/781, 784, 200 MS File, 900 MS File

[56] References Cited
U.S. PATENT DOCUMENTS

| | | | |
|---|---|---|---|
| 3,916,388 | 10/1975 | Shimp et al. ................. | 364/200 |
| 4,001,570 | 1/1977 | Gooding et al. .............. | 364/783 |
| 4,021,655 | 5/1977 | Healy et al. ................. | 364/749 |
| 4,023,023 | 5/1977 | Bourrez et al. ............... | 364/736 |
| 4,224,682 | 9/1980 | Kindell et al. ................ | 364/749 |
| 4,276,596 | 6/1981 | Flynn et al. .................. | 364/778 |
| 4,384,340 | 5/1983 | Tague et al. .................. | 364/736 |

Primary Examiner—Raulfe B. Zache
Assistant Examiner—Dale M. Shaw
Attorney, Agent, or Firm—Antonelli, Terry & Wands

[57] ABSTRACT

A decimal arithmetic unit for carrying out a decimal arithmetic operation for first and second operands each consisting of a sign digit and numeric data comprises arithmetic means for carrying out the decimal arithmetic operation and sign processing means for processing the sign digits. The numeric data excluding the sign digits of the first and second operands are supplied to the arithmetic means and the sign digits of the first and second operands are supplied to the sign processing means. An output of the arithmetic means and an output of the sign processing means are merged to produce an operation result.

10 Claims, 14 Drawing Figures

FIG. 3

FIG. 4 ADDITION

FIG. 5 SUBTRACTION

DECIMAL ARITHMETIC UNIT

The present invention relates to a decimal arithmetic unit of a data processing unit, and more particularly to a high speed adder/subtractor for decimal data including sign bits.

In a data processing unit, a decimal arithmetic operation instruction which is a kind of variable operand length instruction is executed one byte at a time by a one-byte depth arithmetic unit or a plurality of bytes at a time by a four or eight-byte depth arithmetic unit. In the former method, a sign field and a numeric data field of an operand are processed in the same one-byte depth arithmetic unit. It includes less technical problem but has a low speed to execute instructions.

The latter method includes the following two methods.

(i) Right ends of first and second operands are aligned to a right end of the arithmetic unit before the operation.

(ii) The right end of the second operand is aligned to the right end of the first operand before the operation.

In the method (i), the first operand fetched from a main memory is shifted right by a shifter to align the right end of the first operand to the right end of the arithmetic unit. Then, the second operand fetched from the main memory is shifted right to by a shifter to align the right end of the second operand to the right end of the arithmetic unit as is done for the first operand. The aligned operands are then supplied to the arithmetic unit to produce a result. The result is shifted left to align it with the first operand position and it is stored in the main memory.

Since the sign of the operand is included in the rightmost digit (comprising four bits, and two digits are included in one byte) of the operand, a sign processing function is needed only for the rightmost byte of the arithmetic unit in the method (i). However, in the method (i), a total of three steps of alignment of the operands including the right-shift of the first operand, the right-shift of the second operand to align the operands to the right end of the arithmetic unit, and the left-shift of the result are needed. As a result, the time required to align the operand is long in comparison with an actual operation time and hence the instruction execution time is not shortened in spite of the use of a large byte depth arithmetic unit.

The method (ii) is disclosed in Japanese Patent Application No. 55-118218. In processing an operation of a plurality of bytes in the variable operand length instruction at a time by the four or eight-byte depth arithmetic unit, the right end position of the second operand is aligned to the right end position of the first operand before the operation so that the number of steps of the alignment of the operand positions is reduced to reduce the alignment time and improve the ability to execute the instruction.

In the method (ii), the number of steps of the alignment of the operand positions is reduced to one so that the ability to execute the instruction is improved, but since the second operand is aligned to the right end of the first operand, it is necessary that all of the bytes of the arithmetic unit be provided with the sign processing function. This means that the arithmetic unit is complicated and the required number of gates increases.

Figure 1:
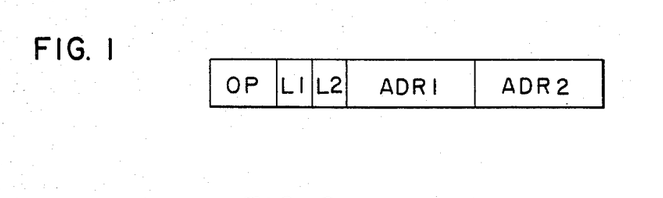
FIG. 1 shows an instruction format of a decimal arithmetic operation instrudtion.

In the following description, an instruction format shown in FIG. 1 is considered as a variable operand length decimal arithmetic operation instruction. In FIG. 1, an OP field specifies the type of operation such as addition, subtraction, multiplication or division, the L1 and L2 fields specify first and second operand lengths, respectively, and the fields ADR1 and ADR2 specify the start addresses of the first and second operands, respectively, on a main memory. The L1 and L2 fields each comprises four bits. (Accordingly, an operand length up to 15 bytes can be designated.) It is assumed that the first operand having a length of L1 bytes starting from the address on the main memory specified by the ADR1 field and the second operand having a length of L2 bytes starting from the address on the main memory specified by the ADR2 field are to be added or subtracted with their right ends (rear ends) aligned and the result is to be stored in the first operand field on the main memory. The rightmost digits of the first and second operands are sign digits which represent signs of the respective operands. It is also assumed that data is transferred by eight-byte blocks in parallel between the processing unit and the main memory.

In order to facilitate the understanding of the present invention, the method (ii) described above will be briefly explained.

Figure 2:
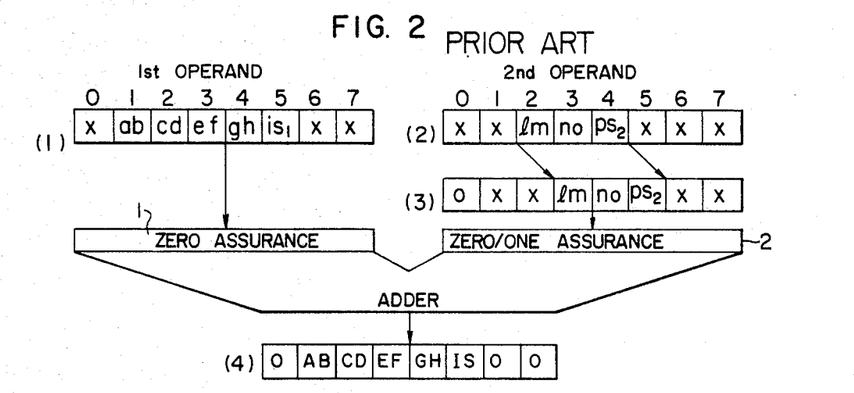
FIG. 2 shows a prior art system which executes the instruction of FIG. 1 a plurality of bytes at a time in an eight-byte depth arithmetic unit.

FIG. 2 illustrates the method (ii), in which a 5-byte first operand having digits "a b c d e f g h i plus sign digit $S_1$" starting at a byte position 1 of an 8-byte interblock address (the lower three bits of the address) of the main memory and a 3-byte second operand having digits "l m n o p plus sign digit $S_2$" starting at a byte position 2 of an 8-byte interblock address are added together. The first operand (1) fetched from the main memory is directly applied to an adder. The second operand (2) fetched from the main memory has its right end position aligned to the right end position of the first operand (1) as viewed in the 8-byte interblock address. That is, the right end (byte position 5) of the second operand (2) is aligned to the right end (byte position 5) of the first operand by shifting the second operand to the right by one byte, and the aligned data (3) is applied to the adder. As a result, a sum (4) ("A B C D E F G H I plus sign digit S") is produced in the first operand position so that it can be directly written into the main memory.

In order to carry out the operation in the manner described above, zeros must be assured at the byte positions on the right of the right ends of the first and second operands (i.e. the byte positions 6 and 7 of the operands (1) and (3)) and the byte positions on the left of the left ends of the first and second operands (i.e. the byte position 0 of the operand (1) and the byte positions 0 to 2 of the operand (3)) for the add operation, and zeros must be assured in the byte positions on the right of the right end of the first operand (i.e. the byte positions 6 and 7 of the operand (1)) and the byte positions on the left of the left end of the first operand (i.e. the byte position 0 of the operand (1)) and ones must be assured in the byte positions on the right of the right end of the second operand (i.e. the byte positions 6 and 7 of the operand (3)) and the byte positions on the left of the left end of the second operand (i.e. the byte positions 0 to 2 of the operand (3)) for the subtract operation, to obtain a correct result. High speed zero and one assurance circuits 1 and 2 shown in FIG. 2 provide high speed zero and one assurance in unnecessary positions of the first and second operands. The circuits 1 and 2 determine the unnecessary positions of the first and second operands, respectively, based on the rightmost byte position of the first operand and the first operand length, and the rightmost byte position of the first operand and the second operand length, respectively, and assure zeros or ones in those positions.

In this method, the number of steps of alignment of the operand positions is reduced to one but all of the bytes of the arithmetic unit must be provided with sign processing functions.

It is an object of the present invention to provide a decimal arithmetic unit which carries out an arithmetic operation for decimal data including sign bits without substantially increasing the required hardware and without lowering the performance of the unit.

In order to achieve the above object, in accordance with the present invention, arithmetic means for carrying out a decimal operation and sign processing means for processing the sign are provided in parallell, and only the numeric data fields of the first and second operands excluding the sign fields are supplied to the arithmetic means, while the sign fields of the first and second operands are supplied to the sign processing means, and the output of the arithmetic means and the output of the sign processing means are combined to produce a result.

As a result, the arithmetic means need not have the sign processing function, although the right end position of the second operand is aligned to the right end position of the first operand.

The present invention will be apparent from the following detailed description taken in conjunction with the accompanying drawings, in which:

Figure 3:
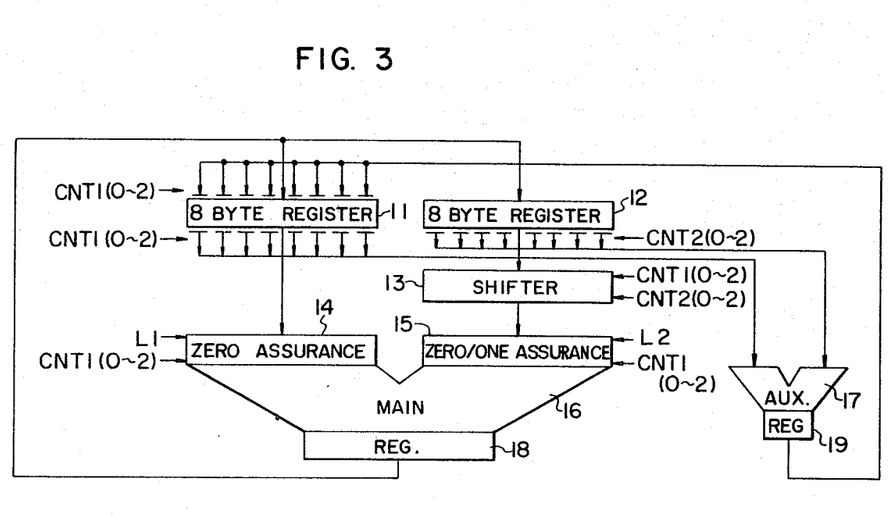
FIG. 3 shows a block diagram of one embodiment of the present invention.

FIG. 3 shows a block diagram of one embodiment of the present invention. In FIG. 3, numerals 11 and 12 denote 8-byte registers for storing first and second operands to be supplied to an arithmetic unit, numeral 13 denotes a shifter for aligning the rightmost byte of the second operand to the rightmost byte position of the first operand, numerals 14 and 15 denote circuits, which correspond to the circuits 1 and 2, respectively, shown in FIG. 2, for assuring zeros or ones in the unnecessary positions of the first and second operands, respectively, numeral 16 denotes an 8-byte depth main arithmetic unit having a decimal add/subtract function, numeral 18 denotes an output register, numeral 17 denotes a one-byte depth auxiliary arithmetic unit which can selectively receive one byte from each of the registers 11 and 12 and has a decimal add/subtract function and a decimal sign processing function, and numeral 19 denotes an output register of the auxiliary arithmetic unit 17.

The output of the main arithmetic unit 16 can be supplied to the registers 11 and 12 through the register 18. The output of the auxiliary arithmetic unit 17 can be supplied to a selected one of the byte positions of the register 11 through the register 19.

In FIG. 3, L1 and L2 denote the first and second operand lengths, respectively, specified by an instruction, and CNT1 (0 to 2) and CNT2 (0 to 2) denote the low order three bits of the start addresses (rightmost addresses) of the first and second operands, respectively, specified by the instruction and are byte position pointers of the 8-byte interblock address.

The one byte including the sign digit of the first operand in the 8-byte register 11 is pointed to by the pointer CNT1 (0 to 2) and is supplied to the auxiliary arithmetic unit 17. The one byte including the sign digit of the second operand in the 8-byte, register 12 is pointed to by the pointer CNT2 (0 to 2) and is supplied to the auxiliary arithmetic unit 17. The one byte from the output register 19 of the auxiliary register 17 is stored at a byte position of the register 11 pointed to by the pointer CNT1 (0 to 2).

The eight bytes of the register 11 are directly supplied to the zero assurance circuit 14, to which L1 and CNT1 (0 to 2) are also supplied. The zero assurance circuit inserts zeros into the positions which are unnecessary to the operation, that is, the unnecessary byte positions on the right of the right end of the first operand, the unnecessary byte positions on the left of the left end of the first operand and the sign digit position, and supplies the zero-inserted data to the main arithmetic unit 16.

The eight bytes of the register 12 are supplied to the shifter 13 which may be a conventional shifter and to which CNT1 (0 to 2) and CNT2 (0 to 2) are also supplied. The shifter 13 shifts the input eight bytes to the right or left in accordance with the difference between CNT1 (0 to 2) and CNT2 (0 to 2) to align the right end of the second operand to the right end position of the first operand. That is, it subtracts CNT2 (0 to 2) from CNT1 (0 to 2) and if the difference is positive, it shifts the second operand to the right by the number of bytes equal to the difference, and if the difference is negative, it shifts the second operand to the left by the number of bytes equal to the difference.

The output of the shifter 13 is supplied to the zero-/one assurance circuit 15, to which L2 and CNT1 (0 to 2) are also supplied. The zero/one assurance circuit 15 inserts zeros or ones into the positions which are unnecessary for the operation, that is, the unnecessary byte positions on the right of the right end of the shifted second operand, the unnecessary byte positions on the left of the left end of the shifted second operand and the sign digit position, and supplies the zero or one-inserted data to the main arithmetic unit 16.

Figure 4:
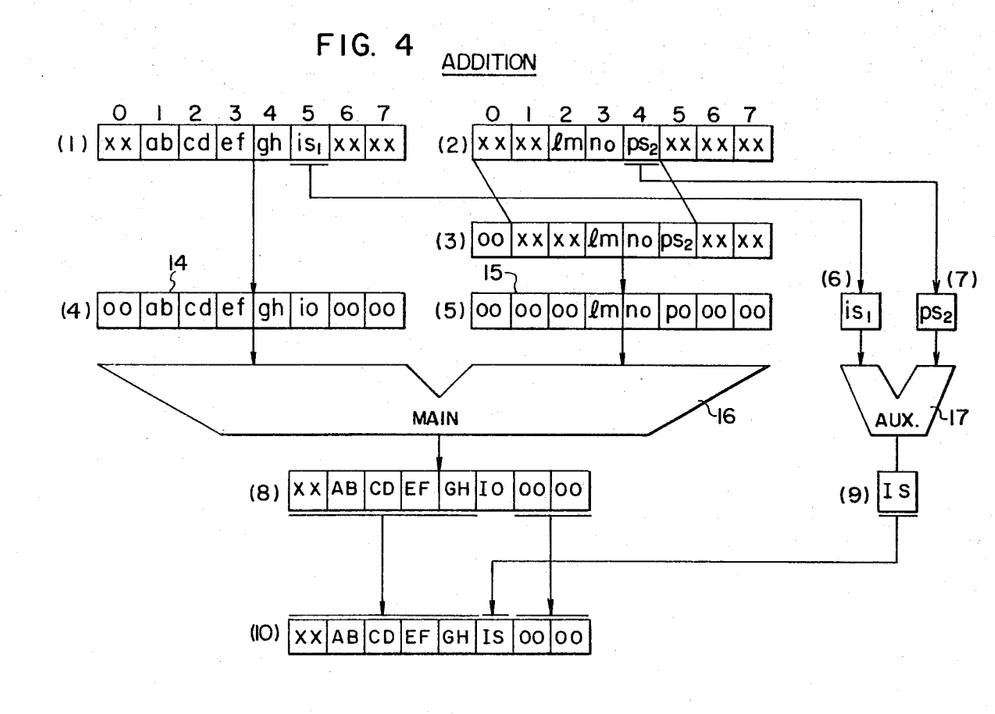
FIGS. 4 and 5 illustrate the operation of the embodiment of FIG. 3;.
Figure 5:
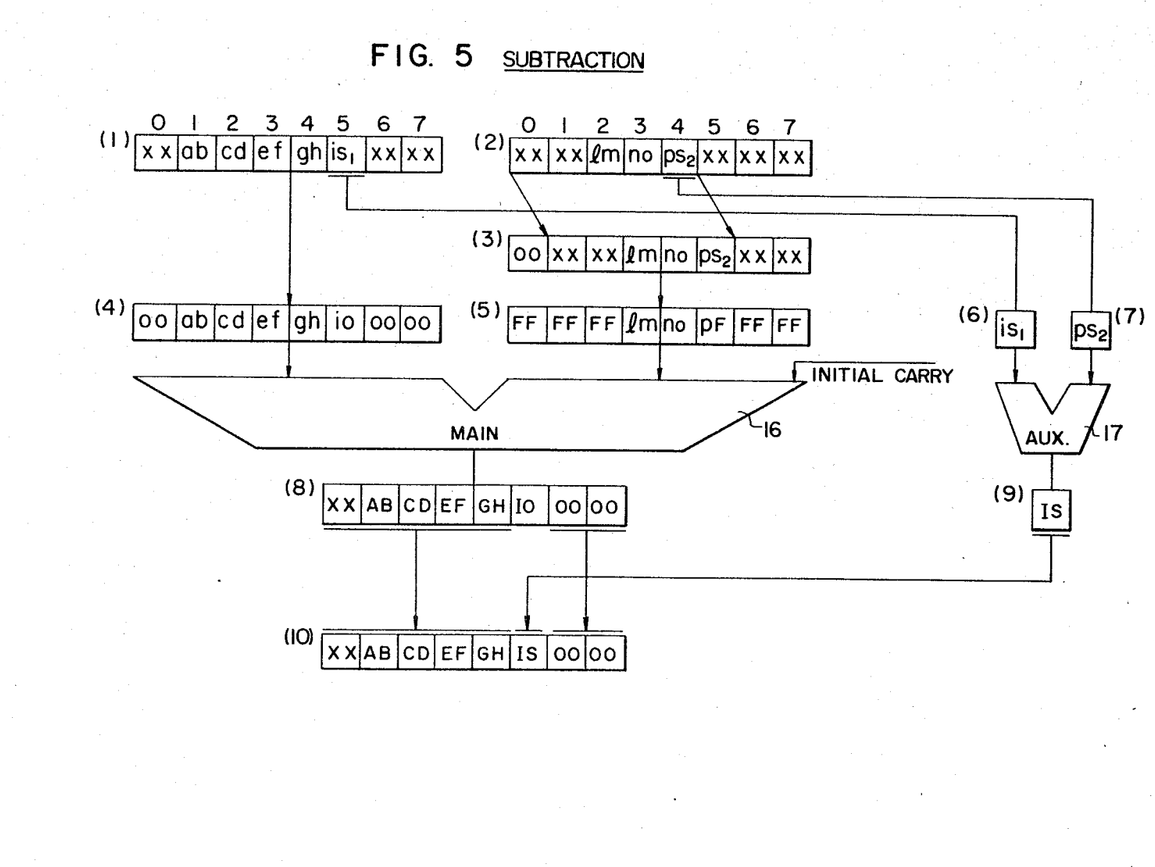

FIGS. 4 and 5 specifically illustrate the operation of the arithmetic units of FIG. 3.

In FIGS. 4 and 5, (1), (2), (3), (4), (5), (8) and (9) denote output data of 11, 12, 13, 14, 15, 18 and 19 of FIG. 4, and (6) and (7) denote input data to 17 or input data to be stored in the register 11 as the operation result.

In the present example, the 5-byte first operand "a b c d e f g h i plus sign digit $S_1$" starting at the first byte position in the 8-byte interblock address on the main memory and the 3-byte second operand "l m n o p plus sign digit $S_2$" starting at the second byte position in the 8-byte interblock address are added or subtracted to obtain a result "A B C D E F G H I". Symbols a–i, l–p and A–I denote decimal digits each comprising a 4-bit digit, and symbols S1, S2 and S3 denote sign digits each comprising a digit.

FIG. 4 shows an example of the addition operation. In accordance with a feature of the present embodiment, the main arithmetic unit 16 is not provided with the sign processing function but the bytes inlcuding the sign digits (the rightmost bytes of the operands) are processed by the auxiliary arithmetic unit 17 and the decimal numeric digits are processed by the main arithmetic unit 16, and the outputs of those arithmetic units are merged to obtain a final result.

In FIG. 4, the first operand (1) is supplied to the zero assurance circuit (14 in FIG. 3) so that zeros are assured in the unnecessary positions to produce the data (4). The second operand (2) is shifted to the right by one byte position by the shifter (13 in FIG. 3) so that the rightmost byte position is aligned to the rightmost byte position of the first operand to produce the data (3), which is then supplied to the zero/one assuarance circuit (15 in FIG. 3) so that zeros are assured in the unnecessary positions to produce the data (5). The data (4) and (5) are supplied to the main arithmetic unit 16 which produces a sum. On the other hand, the bytes iS1 and pS2 of the data (1) and (2) which include the sign digits are supplied to the auxiliary arithmetic unit 17, which processes the data digits (i+p→I) and the sign digits S1 and S2 to produce the result (9). The bytes of the result (8) other than the byte including the sign digit (the bytes 0 to 4 and 6 to 7) and the result IS (9) are merged to produce a final result (10).

The operation of the zero/one assurance circuits (14, 15 in FIG. 4) should be noted here. If zeros are assured only in the unnecessary positions other than the first and second operand byte positions and the sign digits are supplied without modification, the sign digits of the first and second operands are simply added and a correct decimal sum is not obtained because the main digits, the least significant digits (i and p) are not included in the operation by the main arithmetic unit 16 and hence no carry is propagated from that digit to a higher digit. Accordingly, means is required to propagate the carry of the operation for the least significant digits carried out by the auxiliary arithmetic unit 17 to the operation for the higher order digits carried out by the main arithmetic unit 16. Consequently, the hardware becomes complicated or the performance thereof is degraded.

In order to avoid the above problem, the zero/one assurance circuit is provided with a function which assures zeros or ones in the unnecessary byte positions as well as the right-hand digit of the byte including the sign digit. As shown by (4) and (5) in FIG. 4, the data having zeros inserted in all positions including the sign digits except the numeric data positions, of the first and second operands are supplied to the main arithmetic unit 16. As a result, a correct result for the higher order digits which includes the carry from the least significant digit is produced. The operation for the least significant digits in the main arithmetic unit 16 is carried out to merely propagate the carry to the higher order digit, and the output from the auxiliary arithmetic unit 17 including the sign digit is used as the final result for the least significant digit.

The sign processing in the auxiliary arithmetic unit 17 is carried out in the same manner as the prior art. Briefly, when the add operation is carried out in the main processing unit 16, the sign of the result is equal to the sign of the first operand. Accordingly, in the sign processing, the sign of the first operand is produced as the output. The add operation in the main arithmetic unit 16 is carried out when the instruction specifies the add operation and both the first and second operands are positive (and hence the result is also positive) or negative (and hence the result is also negative), or when the instruction specifies the subtract operation and one of the operands is positive while the other operand is negative (when the first operand is positive, the result is also positive, and when the first operand is negative, the result is also negative).

FIG. 5 shows an example of the decimal subtract operation. The output (4) of the zero assurance circuit for the first operand has zeros in the unnecessary byte positions other than the operand byte positions and the digit (sign digit) on the right of the rightmost byte of the operand. On the other hand, the output (5) of the zero-/one assurance circuit for the second operand has ones (F's in hexadecimal notation) assured in the unnecessary byte positions other than the operand byte positions and the digit on the right of the rightmost byte of the operand. As a result, an initial carry for the subtract operation may always be supplied to the byte position 7 of the arithmetic unit, and a carry from the most significant digit of the result (by which the magnitudes of the first and second operands are compared) corresponds to a carry from the byte position 0 of the arithmetic unit. Accordingly, the control of the arithmetic unit and the comparison function are simplified.

The sign processing in the subtract operation is also the same as that of the prior art. In the subtract operation, the sign of the first operand is used as the sign of the result. However, if the second operand is larger, the sign of the result is opposite to that of the first operand so that the sign is inverted when the complement operation is carried out.

The zero/one assurance circuits 14 and 15 are now explained.

It is now assumed that the low order three bits on the right of the rightmost address of the first operand are set by the 8-byte interblock byte position pointers CNT1 (0), CNT1 (1) and CNT1 (2).

Table 1 shows the unnecessary byte positions on the right of the rightmost byte of the operand. For example, when CNT1 (0 to 2) is 5, the byte positions 6 to 7 are unnecessary byte positions. (The examples of the first operand (4) and the second operand (5) shown in FIGS. 4 and 5.)

TABLE 1

| | | | Value of CNT1 (0 to 2) | | | | |
|---|---|---|---|---|---|---|---|
| 0 | 1 | 2 | 3 | 4 | 5 | 6 | 7 |
| 1 to 7 | 2 to 7 | 3 to 7 | 4 to 7 | 5 to 7 | 6 to 7 | 7 | — |

Table 2 shows unnecessary byte positions on the left of the leftmost byte of the operand. For example, when CNT1 (0 to 2) is 5 and the operand length is 3-byte, the byte positions 0 to 2 are the unnecessary byte positions. (The example of the second operand (5) shown in FIGS. 4 and 5.)

TABLE 2

| Operand byte length | Value of CNT1 (0 to 2) | | | | | | | |
|---|---|---|---|---|---|---|---|---|
| | 0 | 1 | 2 | 3 | 4 | 5 | 6 | 7 |
| 0 | 0 | 0 to 1 | 0 to 2 | 0 to 3 | 0 to 4 | 0 to 5 | 0 to 6 | 0 to 7 |
| 1 | — | 0 | 0 to 1 | 0 to 2 | 0 to 3 | 0 to 4 | 0 to 5 | 0 to 6 |
| 2 | — | — | 0 | 0 to 1 | 0 to 2 | 0 to 3 | 0 to 4 | 0 to 5 |
| 3 | — | — | — | 0 | 0 to 1 | 0 to 2 | 0 to 3 | 0 to 4 |

TABLE 2-continued

| Operand byte length | Value of CNT₁ (0 to 2) | | | | | | | |
|---|---|---|---|---|---|---|---|---|
| | 0 | 1 | 2 | 3 | 4 | 5 | 6 | 7 |
| 4 | — | — | — | — | 0 | 0 to 1 | 0 to 2 | 0 to 3 |
| 5 | — | — | — | — | — | 0 | 0 to 1 | 0 to 2 |
| 6 | — | — | — | — | — | — | 0 | 0 to 1 |
| 7 | — | — | — | — | — | — | — | 0 |
| 8 or longer | — | — | — | — | — | — | — | — |

Accordingly, by supplying to the arithmetic unit the first and second operands having zeros or ones assured in all of the unnecessary byte positions shown in Tables 1 and 2 and the sign digits, a correct result is obtained. The symbol "-" in Tables 1 and 2 indicates that the unnecessary byte is not present.

Figure 6:
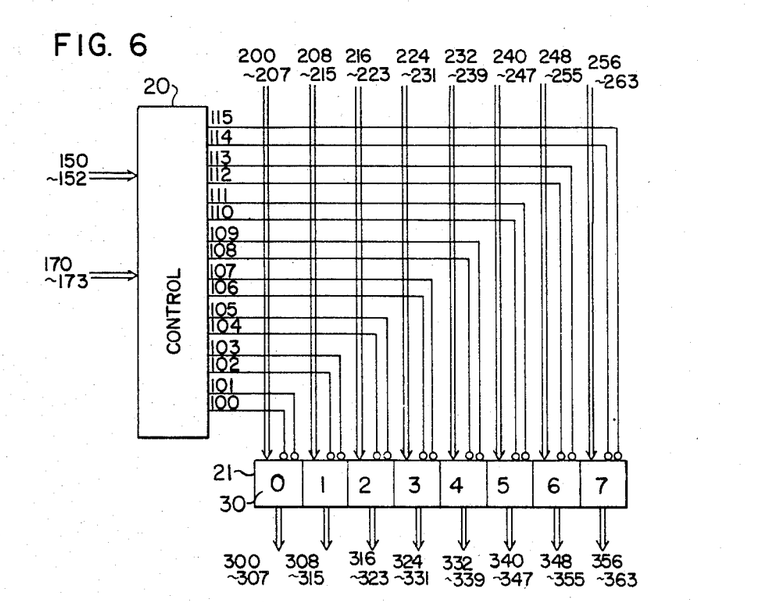
FIG. 6 shows a block diagram of a zero assurance circuit shown in FIG. 3.

FIG. 6 shows an embodiment of the zero/one assurance circuits 14 and 15 of FIG. 3. In FIG. 6, numeral 20 denotes a control circuit of the zero/one assurance circuit, which receives inputs 150 to 152 and 170 to 173 and produces unnecessary digit suppress signals 100 to 115 in accordance with Tables 1 and 2. The inputs 150 to 152 specify the rightmost byte position of the first operand, which are derived from CNT1 (0 to 2). The inputs 170 to 173 specify the operand length, which is derived from the four bits of the L1 field in FIG. 1 for the assurance circuit 14 shown in FIG. 3, and from the four bits of the L2 field of FIG. 1 for the assurance circuit 15 shown in FIG. 3. In the following description, the assurance circuit 14 for the first operand shown in FIG. 3 is explained although the assurance circuit 15 for the second operand shown in FIG. 3 is similar except that it assures zeros or ones instead of zeros.

Figure 7:
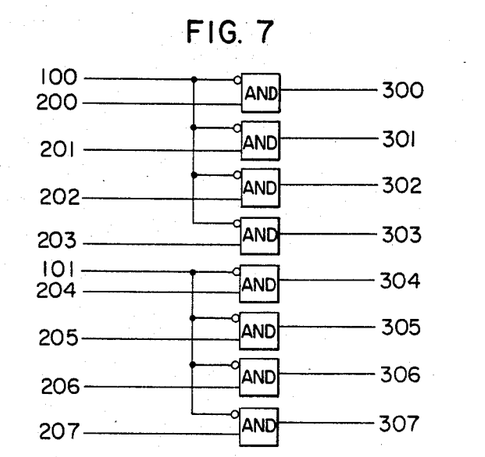
FIGS. 7 to 13 show block diagrams of gate circuits and control circuits for the circuit for the circuit shown in FIG. 6.

In FIG. 6, numeral 21 denotes an 8-byte depth gate circuit which receives the first operand inputs 200 to 263 from the register 11 (FIG. 3) and produces signals 300 to 363 having zeros assured in the unnecessary digits specified by the control signals 100 to 115 for the digits 0 to 15. The outputs 300 to 363 of the gate circuit 21 are supplied to the first operand input terminals of the main arithmetic unit 16 of FIG. 3. Numeral 30 denotes a byte 0 of the gate circuit 30, which comprises eight AND gates as shown in FIG. 7. In FIG. 7, eight-bit input data signals 200 to 207 to the byte 0 are gated by the unnecessary digit suppress signals 100 and 101 to produce the output data signals 300 to 307. When the digit 0 is the unnecessary digit which is to be zero-assured, the unnecessary digit suppress signal 100 assumes a logical "1" so that the output signals 300 to 303 are all rendered to "0".

FIGS. 8 to 13 shows embodiments of the control circuit 20 of FIG. 6.

Figure 8:
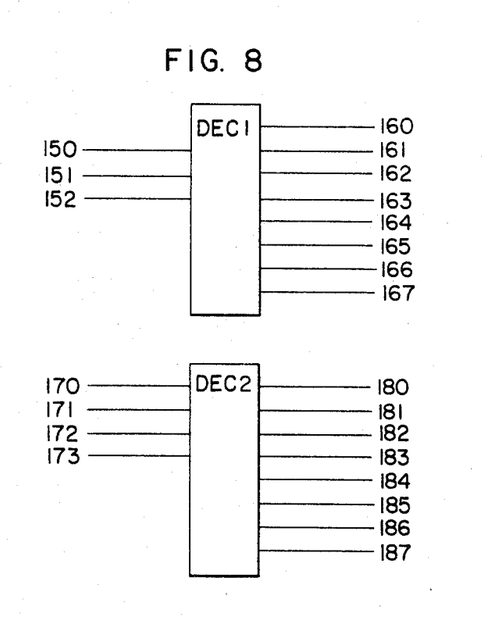
Figure 9A:
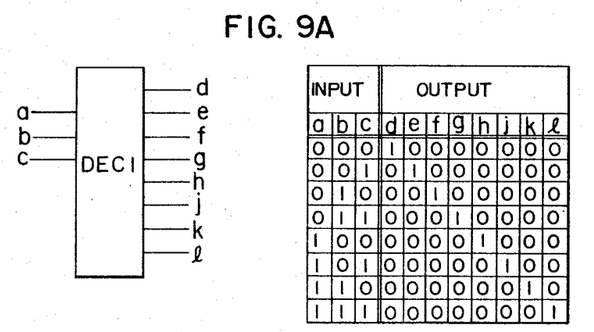
Figure 9B:
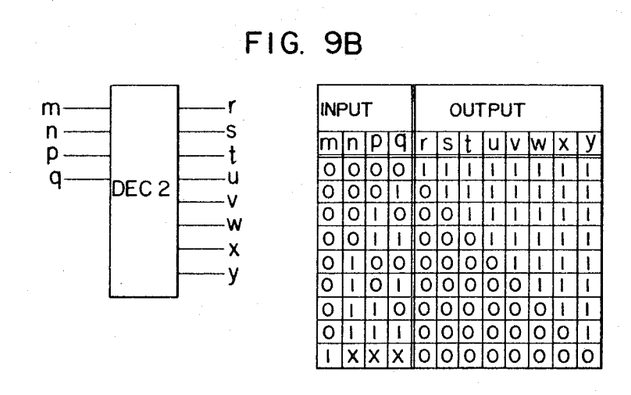

FIG. 8 shows a decoder DEC1 for the signals 150 to 152, that is, CNT1 (0 to 2), indicating the rightmost byte position of the first operand, and a decoder DEC2 for the signals 170 to 173, that is, the L1 field of the instruction, indicating the byte length of the first operand. The relations between the inputs and the outputs of the decoders DEC1 and DEC2 are shown in FIGS. 9A and 9B.

Figure 10:
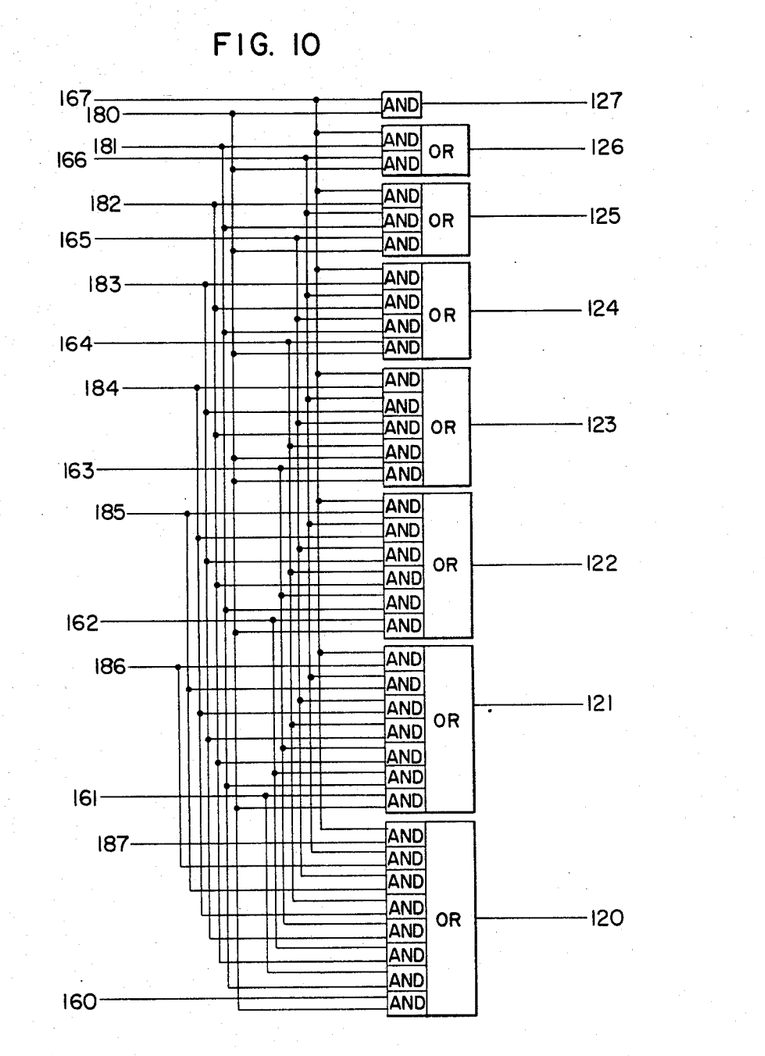

FIG. 10 shows an embodiment of a logic circuit for determining the unnecessary byte positions on the left of the leftmost byte of the operand shown in Table 2. The logic circuit receives the outputs 160 to 167 and 180 to 187 of the decoders shown in FIG. 8 and produces the suppress signals 120 to 127 for the bytes 0 to 7.

Figure 11:
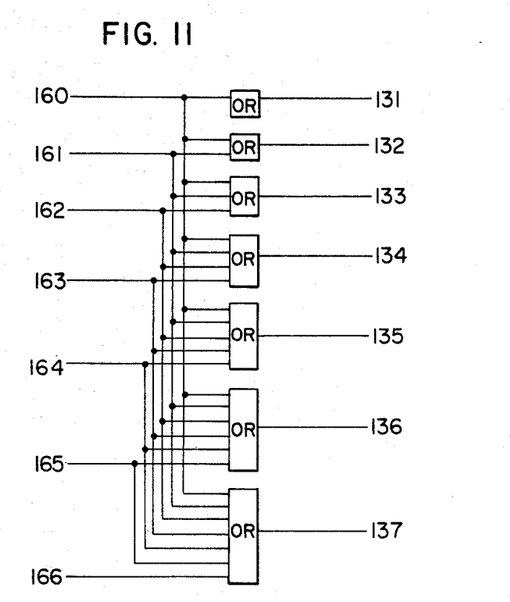

FIG. 11 shows an embodiment of a logic circuit for determining the unnecessary byte positions on the right of the rightmost byte of the operand shown in Table 1. It receives the decoder outputs 160 to 166 in FIG. 8 and produces the suppress signals 131 to 137 for the bytes 1 to 7.

Figure 12:
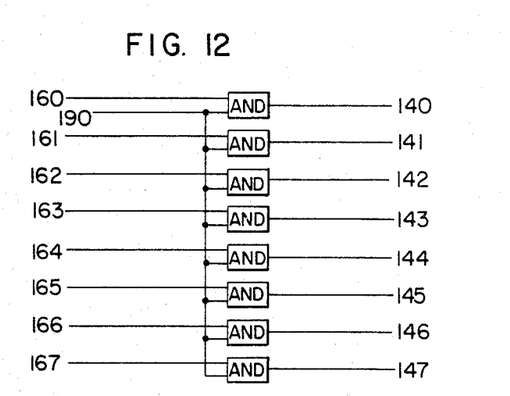

FIG. 12 shows an embodiment of a logic circuit for determining the sign digit of the operand. It receives the decoder outputs 160 to 167 in FIG. 8 and a signal 190 indicating the operation of the double word including the sign digit and produces the suppress signals 140 to 147 for the digits on the right of the respective bytes, that is, the digits 1, 3, 5, 7, 9, 11, 13 and 15. In the operation of the double word which does not include the sign digit, the signal 190 is not "1" and the output signals 140 to 147 in FIG. 12 are zeros.

Figure 13:
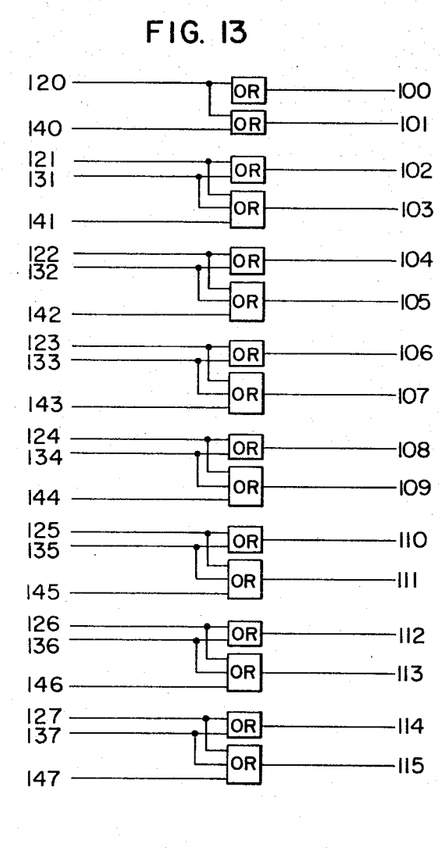

FIG. 13 shows OR circuits for the unnecessary byte suppress signals 120 to 127 and 131 to 137 and the sign digit suppress signals 140 to 147 shown in FIGS. 10 to 12. The outputs 100 to 115 of the OR circuits are the outputs of the control circuit 20 of FIG. 6, that is, the suppress signals 100 to 115 of the digits 0 to 15 of the input data to the main arithmetic unit.

A feature of FIG. 13 resides in the fact that the unnecessary byte suppress signals 120 to 127 and 131 to 137 are reflected to the supress signals 100 to 115 for the digits 0 to 15 while the sign digit suppress signals 140 to 147 are reflected to the suppress signals 101, 103, 105, 107, 109, 111 to 113 and 115 for the digits on the right of the respective bytes.

While the zero assurance circuit 14 for the first operand shown in FIG. 3 has been described, the zero/one assurance circuit 15 for the second operand may be constructed in a similar manner and for the one-assurance, the output signals of FIG. 6 are one-assured and the output signals 100 to 115 of the control circuit 20 of FIG. 6 are used as one-assurance signals for the unnecessary digits.

In the substract operation of FIG. 5, zeros are assured for the unnecessary digits of the first operand and ones are assured for the unnecessary digits of the second operand. By supplying the initial carry to the least significant bit position (byte 7, bit 7 of the 8-byte data), the carry is propagated in the substractor so that the initial carry is propagated to the least significant bit of the effective digit (byte 1, bit 0 of the data (5) shown in FIG. 5) and the final carry from the most significant bit of the effective byte (byte 1, bit 0 of the data (8) of FIG. 5) propagates the one-assured byte (byte 0 of the data (5) of FIG. 5) to the most significant bit position (byte 0, bit 0 for the 8-byte data).

As a result, it is not necessary to supply the initial carry to the least significant bit of the effective digit and take out the final carry from the most significant bit of the effective digit, and hence the circuit can be simplified. Without the one-assurance for the unnecessary digits of the second operand, a circuit for supplying the initial carry to the least significant bits of the respective digits of the arithmetic unit (16 bits for the 8-byte depth arithmetic unit) and a circuit for taking out the final carry would be required and hence the required amount of hardware would increase.

The operation of the arithmetic unit having the zero-/one assurance circuits when the operand extends across the 8-byte boundary is explained. As an example, it is assumed that the rightmost byte of the first operand is at the byte position 4 in the 8-byte block and the first operand length is 9-byte. A first run of the operation is carried out with CNT1 (0 to 2)=4 and zeros or ones are inserted in the bytes 5 to 7 of the input to the main arithmetic unit and the digits on the right of the byte 4 in accordance with the Tables 1 and 2, and the result is obtained in the byte positions 0 to 4. After the first run of the operation, CNT1 (0 to 2) is set to 7 and the number of bytes processed in the first run of the operation is subtracted from the operand length L1. In the present example, since fixed bytes are processed in the first run of the operation, the remaining operand length is equal to 4 bytes (9 bytes minus 5 bytes). In the subtract operation, the final carry in the first run of the subtract operation is stored and used as the initial carry in the second run of the subtract operation. In the second run of the operation, CNT1 (0 to 2) is 7 in accordance with the Table 2 and the operand length is 4-byte and no sign digit is included. Therefore, zeros or ones are inserted in the bytes 0 to 3 of the input and the result is obtained in the byte positions 4 to 7. The result in the second run of the operation is stored at the first operand address on the main memory to complete the operation. In the subtract operation, if the final carry is not produced in the second run of the operation, the result is complemented before it is stored.

In the embodiment of FIG. 3, the auxiliary arithmetic unit 17 is of one-byte depth and has the decimal add-/subtract function and the decimal sign processing function, and it receives one byte including the sign digit and produces one-byte output which is supplied to a selected one byte of the register 11. This is based on the fact that a conventional data processing unit processes the data one byte at a time. Alternatively, the auxiliary arithemtic unit 17 may be of 4-bit depth and have only the sign processing function and receive only the sign digit. In this case, the digits on the right of the bytes specified by CNT1 (0 to 2) and CNT2 (0 to 2) are supplied from the registers 11 and 12 to the auxiliary arithmetic unit 17 and the content of the register 19 is stored in the register 11 at the digit positions on the right of the byte specified by CNT1 (0 to 2). The other operations remain unchanged.

According to the present invention, in the data processing unit which executes the decimal arithmetic operation instruction a plurality of bytes at a time by the multi-byte width main arithmetic unit, a high speed decimal arithmetic operation is attained without providing the sign processing function to the main arithmetic unit so that the decimal arithmetic operation performance is improved without substantial hardware increase.

What is claimed is:

1. A decimal arithmetic unit for carrying out a decimal arithmetic operation for first and second operands each having a sign digit and numeric data, comprising:
   arithmetic means for carrying out the decimal arithmetic operation;
   sign processing means for processing the sign digits;
   first circuit means for supplying the numeric data of said first and second operands excluding the sign digits to said arithmetic means;
   second circuit means for supplying the sign digits of said first and second operands to said sign processing means; and
   means for merging an output of said arithmetic means and an output of said sign processing means to produce an operation result;
   wherein said first circuit means comprises:
   zero assurance means connected to receive said first operand for changing the part of said first operand which is not numeric data to zero in accordance with the operand addresses and the operand length of the first operand and for applying the thus changed first operand to said arithmetic means;
   aligning means for aligning the right end position of said second operand to the right end position of said first operand in accordance wthi the operand addresses of said first and second operands; and
   zero/one assurance means connected to receive said second operand for changing the part of said second operand which is not numeric data to zero or one depending on the arithmetic operation to be performed by sadi arithmetio means and for applying the thus changed second operand to said arithmetic means.

2. A decimal arithmetic unit according to claim 1, wherein said zero/one assurance means comprises means for changing the part of the second operand which is not numeric data to zero for an adding operation and to one for a subtracting operation by said arithmetic means.

3. A decimal arithmetic unit according to claim 1, wherein said zero/one assurance means is connected to receive said second operand via said aligning means.

4. A decimal arithmetic unit according to claim 1 wherein said first circuit means supplies an initial carry to the least significant digit of said arithmetic means.

5. A decimal arithmetic unit for carrying out a decimal arithmetic operation for first and second operands each starting from any address on a main memory, having any byte length and having a plurality of decimal numeric digits and a sign digit, comprising:
   main arithmetic means having multi-byte depth input terminals for carrying out the decimal operation for multi-byte input data simultaneously;
   auxiliary arithmetic means having one-byte depth input terminals and having a decimal arithmetic operation function and a sign processing function;
   circuit means for assuring zeros or ones in bytes other than operand bytes of the multi-byte input data including the operands supplied to said main arithmetic means and in the sign digits of the operands;
   means for supplying one byte including the sign digit of each of said first and second operands to said auxiliary arithmetic means; and
   means for merging an output of said auxiliary arithmetic means to selected one-byte positions of an output of said main arithmetic means.

6. A decimal arithmetic unit according to claim 5 further comprising means for aligning a rightmost position of said second operand to a rightmost position of said first operand, and supplying the aligned second operand to said circuit means.

7. A decimal arithmetic unit according to claim 6 wherein said circuit means assures zeros in an add operation.

8. A decimal arithmetic unit according to claim 6 wherein, in a subtract operation, said circuit means assures zeros in the input data including said first operand and ones in the input data including said second operand.

9. A decimal arithmetic unit according to claim 8 further comprising means for supplying an initial carry to a least significant digit position of said main arithmetic unit.

10. A decimal arithmetic unit according to claim 5 wherein said circuit means includes first means for producing signals to suppress the bytes on the right of the rightmost bytes of the operands and the bytes on the left of the leftmost bytes of the operands in accordance with operand addresses and operand lengths specified by an instruction, second means for producing signals to suppress the sign digits of the bytes including the sign digits in accordance with the operand addresses specified by the instruction, and gate means for suppressing the bytes and the digits in accordance with said signals from said first and second means.

* * * * *